United States Patent
Onozawa et al.

(10) Patent No.: US 9,426,778 B2
(45) Date of Patent: Aug. 23, 2016

(54) ELECTRONIC APPARATUS, LOCATION ESTIMATING METHOD, AND STORAGE MEDIUM

(71) Applicant: CASIO COMPUTER CO., LTD, Tokyo (JP)

(72) Inventors: Masaru Onozawa, Tokyo (JP); Kosuke Matsumoto, Tokyo (JP); Takashi Yahata, Tokyo (JP); Naotomo Miyamoto, Tokyo (JP); Yoshitsugu Manabe, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/791,549

(22) Filed: Jul. 6, 2015

(65) Prior Publication Data

US 2016/0007318 A1    Jan. 7, 2016

(30) Foreign Application Priority Data

Jul. 7, 2014   (JP) .................................. 2014-139824

(51) Int. Cl.
*H04W 64/00*   (2009.01)
*H04W 4/02*    (2009.01)

(52) U.S. Cl.
CPC ............ *H04W 64/006* (2013.01); *H04W 4/021* (2013.01)

(58) Field of Classification Search
CPC ...... H04W 64/006; H04W 4/02; H04W 4/021
See application file for complete search history.

(56) References Cited

U.S. PATENT DOCUMENTS

2009/0005979 A1* 1/2009 Nakao .................... G01C 21/30
701/414

FOREIGN PATENT DOCUMENTS

JP           2014-33334 A       2/2014

* cited by examiner

*Primary Examiner* — Curtis Odom
(74) *Attorney, Agent, or Firm* — Fitch Even Tabin & Flannery LLP

(57) ABSTRACT

An electronic apparatus for acquiring a location, comprising: a location acquiring unit which acquires a current location of the electronic apparatus; a correction area setting unit which, based on a link attribute indicating an attribute of an adjacent area of a link in map data, sets a correction area within the adjacent area, the correction area being referred to correct the current location to a location on the link; and a location correcting unit which, in a case in which the current location acquired by the location acquiring unit belongs to the correction area set within the adjacent area, corrects the current location to a location on the link which corresponds to the correction area.

7 Claims, 5 Drawing Sheets

| LINK INFORMATION | | | |
|---|---|---|---|
| LINK 1 | STARTING POINT | | |
| LINK 2 | ENDING POINT | | |
| ⋮ | LINK DISTANCE | LINK ATTRIBUTE | |
| LINK 3 | LINK DIRECTION | CORRECTION AREA | MAGNIFICATION/REDUCTION CONDITION |
| | LINK ATTRIBUTE | LEFT, 1 M | TIME 5:00-22:00 ->20m |
| | ⋮ | RIGHT, 20 M | PRIOR ACTION, STOPPING, AND ENTERING ->1M |

ELECTRONIC APPARATUS, LOCATION ESTIMATING METHOD, AND STORAGE MEDIUM

This application is based on and claims the benefit of priority from Japanese Patent Application No. 2014-139824, filed on 7 Jul. 2014, the content of which is incorporated herein by reference.

BACKGROUND OF THE INVENTION

1. Field of the Invention

The present invention relates to an electronic apparatus, a location estimating method, and a storage medium.

2. Related Art

Mobile-type electronic apparatuses called smartphones have been widely used conventionally. Such mobile-type electronic apparatuses include an acceleration sensor, a magnetic field sensor, GPS (Global Positioning System), and the like, and can perform map matching and display a current location based on positional information acquired based on various sensors, GPS, etc.; map data; and route information that has been set. On the other hand, an apparatus produced by embedding the functions of a smartphone into a wrist-watch-type electronic apparatus (so called Smart Watch) has been developed. For example, Japanese Unexamined Patent Application, Publication No. 2014-033334 discloses a technology relating to wrist-watch-type computer having a positional information acquisition function. In the conventional technology for displaying a current location as mentioned above, since data of a current location acquired using GPS, etc. include error, in a case of displaying the current location on a map, the location is corrected so as to be located at a link such as a road on the map data which is the closest to the data of the current location. However, contrary to automobiles, etc., there may be a case in which a user carrying a smart phone, etc. does not move on a link such as a road. For this reason, if correcting the location to the link which is the closest to the data of the current location, it will not necessarily be possible to display the appropriate location. As such, it has been difficult to estimate a location with high precision in the conventional technologies.

SUMMARY OF THE INVENTION

The present invention has been made to address such a problem, and thus has an object of estimating a location with higher precision.

According to an embodiment of the present invention, an electronic apparatus for acquiring a location, comprising: a location acquiring unit which acquires a current location of the electronic apparatus; a correction area setting unit which, based on a link attribute indicating an attribute of an adjacent area of a link in map data, sets a correction area within the adjacent area, the correction area being referred to correct the current location to a location on the link; and a location correcting unit which, in a case in which the current location acquired by the location acquiring unit belongs to the correction area set within the adjacent area, corrects the current location to a location on the link which corresponds to the correction area.

According to an embodiment of the present invention, acquiring a current location of the electronic apparatus; setting a correction area within the adjacent area based on a link attribute indicating an attribute of an adjacent area of a link in map data, the correction area being referred to correct the current location to a location on the link; and correcting the current location to a location on the link which corresponds to the correction area, in a case in which the current location acquired in the location acquiring step belongs to the correction area.

According to an embodiment of the present invention, a non-transitory storage medium encoded with a computer-readable program for controlling an electronic apparatus is provided in which the program enables a computer to execute: a location acquiring function of acquiring a current location of the electronic apparatus; to acquire a current location of the electronic apparatus; to set a correction area within the adjacent area based on a link attribute indicating an attribute of an adjacent area of a link in map data, the correction area being referred to correct the current location to a location on the link; and to correct the current location to a location on the link which corresponds to the correction area, in a case in which the current location acquired in the location acquiring step belongs to the correction area.

DETAILED DESCRIPTION OF THE INVENTION

In the following, embodiments of the present invention are described with reference to the drawings.

Hardware Configuration

Next, the hardware configuration of a wrist terminal 1 of the present embodiment is described with reference to FIG. 1.

Figure 1A:
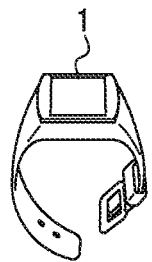
FIG. 1A is a view illustrating an outer appearance of a wrist terminal as an embodiment of an electronic apparatus according to the invention of the present application.
Figure 1B:
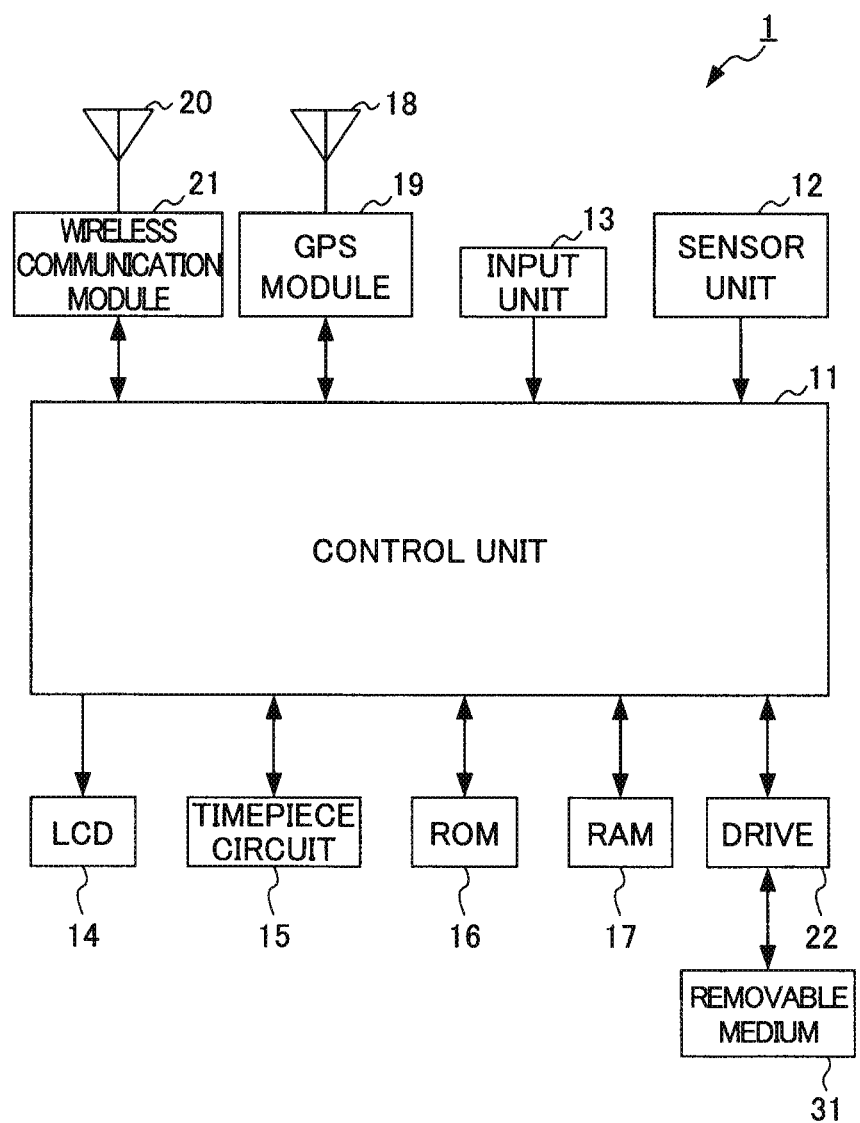
FIG. 1B is a block diagram illustrating a hardware configuration of a wrist terminal as an embodiment of an electronic apparatus according to the invention of the present application.

FIG. 1 is a diagram illustrating the configuration of the wrist terminal 1 as an embodiment of an electronic apparatus according to the invention of the present application, with FIG. 1A being a view illustrating an outer appearance thereof, and FIG. 1B being a block diagram illustrating a hardware configuration thereof.

Figure 2A:
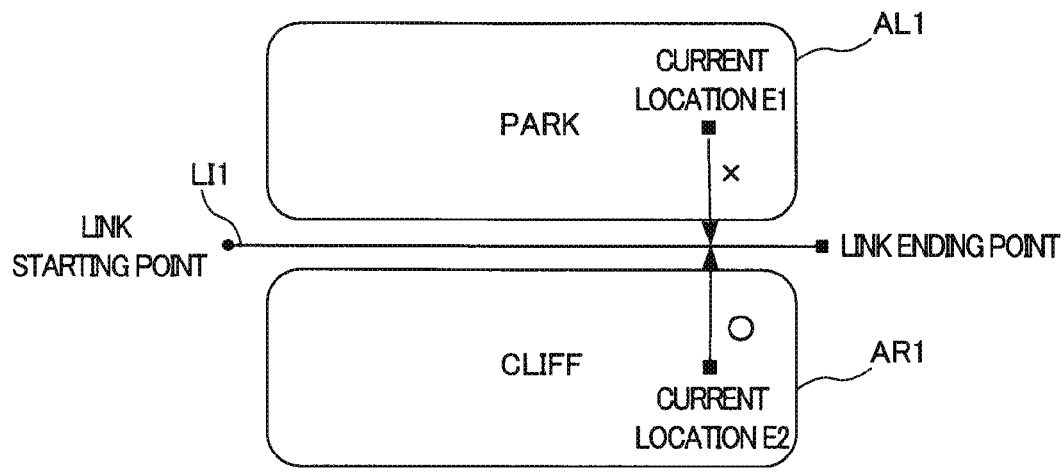
FIGS. 2A and 2B are a conceptual view illustrating an outline of a location estimating method of the present embodiment.

As illustrated in FIG. 2A, the wrist terminal 1 is an electronic apparatus that is configured to be of wristwatch type and has functions similar to a smart phone.

Furthermore, as illustrated in FIG. 1B, the wrist terminal 1 includes a control unit 11, a sensor unit 12, an input unit 13, an LCD (Liquid Crystal Display) 14, a timepiece circuit 15, ROM (Read Only Memory) 16, RAM (Read Access Memory) 17, a GPS antenna 18, a GPS module 19, a wireless communication antenna 20, a wireless communication module 21, and a drive 22.

The control unit 11 is configured with an arithmetic processing unit such as a CPU (Central Processing Unit) and controls the overall operation of the wrist terminal 1. For example, the control unit 11 executes various types of processing according to a program such as a program for location estimating processing (described later) stored in the ROM 16.

The sensor unit 12 includes various types of sensors such as a three-axis acceleration sensor, a magnetic sensor, a pressure sensor, and temperature sensor.

The input unit 13 is configured with various buttons or capacitive-type or resistance-film-type position input sensors laminated on a display area of the LCD 14, and inputs various types of information according to a user's operation for instruction.

The LCD 14 outputs an image according to an instruction of the control unit 11. For example, the LCD 14 displays various images and screens of a user interface. In the present embodiment, a position input sensor of the input unit 13 is arranged so as to be superimposed on the LCD 14 to constitute a touch screen.

The timepiece circuit 15 generates a time signal from signals generated by a system clock or oscillator to output the current time.

The ROM 16 stores information such as control programs executed by the control unit 11.

The RAM 17 provides a work area upon the control unit 11 executing various types of processing.

The GPS antenna 18 receives radio waves sent from satellites for GPS, converts them into electrical signals, and outputs the electrical signals thus converted (hereinafter, referred to as "GPS signal") to the GPS module 19. The GPS module 19 detects the location (latitude, longitude, and altitude) of the wrist terminal 1 and the current time shown by the GPS based on the GPS signals inputted from the GPS antenna 18. Furthermore, the GPS module 19 outputs information showing the location thus detected and the current time to the control unit 11.

The wireless communication antenna 20 is an antenna that can receive radio waves of frequencies corresponding to wireless communication used by the wireless communication module 21 and is configured with a loop antenna and a rod antenna, for example. The wireless communication antenna 20 sends electrical signals of wireless communication inputted from the wireless communication module 21 as electromagnetic waves, converts the electromagnetic waves thus received into electrical signals, and outputs them to the wireless communication module 21.

The wireless communication module 21 sends signals to another apparatus via the wireless communication antenna 20 in accordance with an instruction from the control unit 11. Furthermore, the wireless communication module 21 receives signals sent from another apparatus and outputs information indicated by the signals thus received to the control unit 11.

A removable medium 31 composed of a magnetic disk, an optical disk, a magneto-optical disk, semiconductor memory or the like is installed in the drive 22, as appropriate. The removable medium 31 can store a variety of data such as the image data.

Herein, an outline of a location estimating method of the present embodiment is described.

Figure 2B:
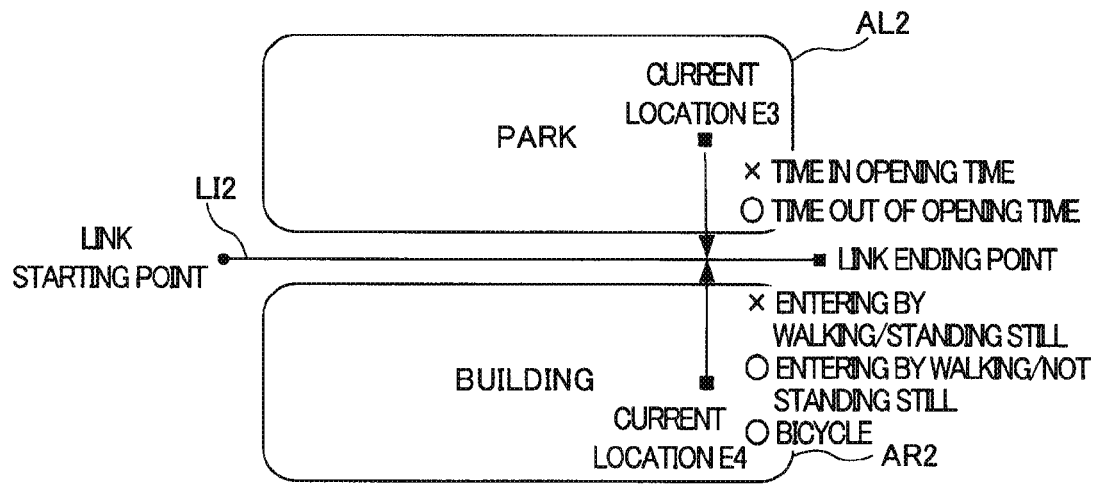

FIGS. 2A and 2B are a conceptual view illustrating an outline of a location estimating method of the present embodiment.

FIG. 2A illustrates a link LI1 corresponding to a road on a map, a left area AL 1 adjacent to the link LI1, and a right area AR1 adjacent to the LI1. The left area AL1 is a park and the right area AR1 is a cliff. It should be noted that a user carrying the wrist terminal 1 progresses from left to right in the drawings.

In a case of performing navigation while traveling by car, a situation in which the car travels in a park without a road or travels over a cliff is not expected normally. For this reason, upon estimating the current location of a car, if the current location of the car acquired is located at a park (the left area AL1) or a cliff (the right area AR1), the current location is corrected to the Link LI1.

On the other hand, in the case of walking or traveling by bicycle, there may be a case of traveling in a park without a road. Furthermore, even in a case of walking or traveling by bicycle, travelling over a cliff is not expected normally. For this reason, in a case of walking or traveling by bicycle, when the current location acquired is located in a park such as the case of a current location being located at the current location E1, the location of the wrist terminal 1 can be estimated with higher precision by retaining the current location E1 as-is and not correcting the current location to the link. On the other hand, when the current location acquired is located on a cliff such as the case of the current location being located at the current location E2, the location of the wrist terminal 1 can be estimated with higher precision by correcting the current location from the current location E2 to a location on the link.

Furthermore, FIG. 2B illustrates a link LI2 corresponding to a road on a map, a left area AL2 adjacent to the link LI2, and a right area AR2 adjacent to the link LI2. The left area AL2 is a park and the right area AR2 is a building.

In a case of walking or traveling by bicycle, etc., there may be a case of traveling in a park without a road as mentioned above. However, during a time slot outside of the open time of the park, traveling in the park is not expected normally even if it is a case of walking or traveling by bicycle, etc. For this reason, in a case of walking or traveling by bicycle, etc., during the time slot outside of the open time of the park, the location of the wrist terminal 1 can be estimated with higher precision by correcting the current location from the current location E3 to a location on a link. On the other hand, during a time slot within the open time of the park, the location of the wrist terminal 1 can be estimated by not correcting the current location from the current location E3 to a location on the link.

Furthermore, the case of traveling by walking assumes the entering of doorways into a building and traveling in the building. On the other hand, even in a case of traveling by bicycle or in a case of not entering doorways into the building even though of traveling by walking, entering into a building is not expected normally. For this reason, if it is a case in which entering doorways into a building is not assumed even when a case of traveling by bicycle or walking, the location of the wrist terminal 1 can be estimated with higher precision by correcting the current location E4 to a location on the link. On the other hand, if it is a case in which traveling by walking and having entered doorways into the building are estimated, the location of the wrist terminal 1 can be estimated with higher precision by not correcting the current location E4 to a location on the link.

Functional Configuration

Next, a functional configuration for executing location estimating processing among the functional configurations of the wrist terminal 1 is described.

Figure 3:
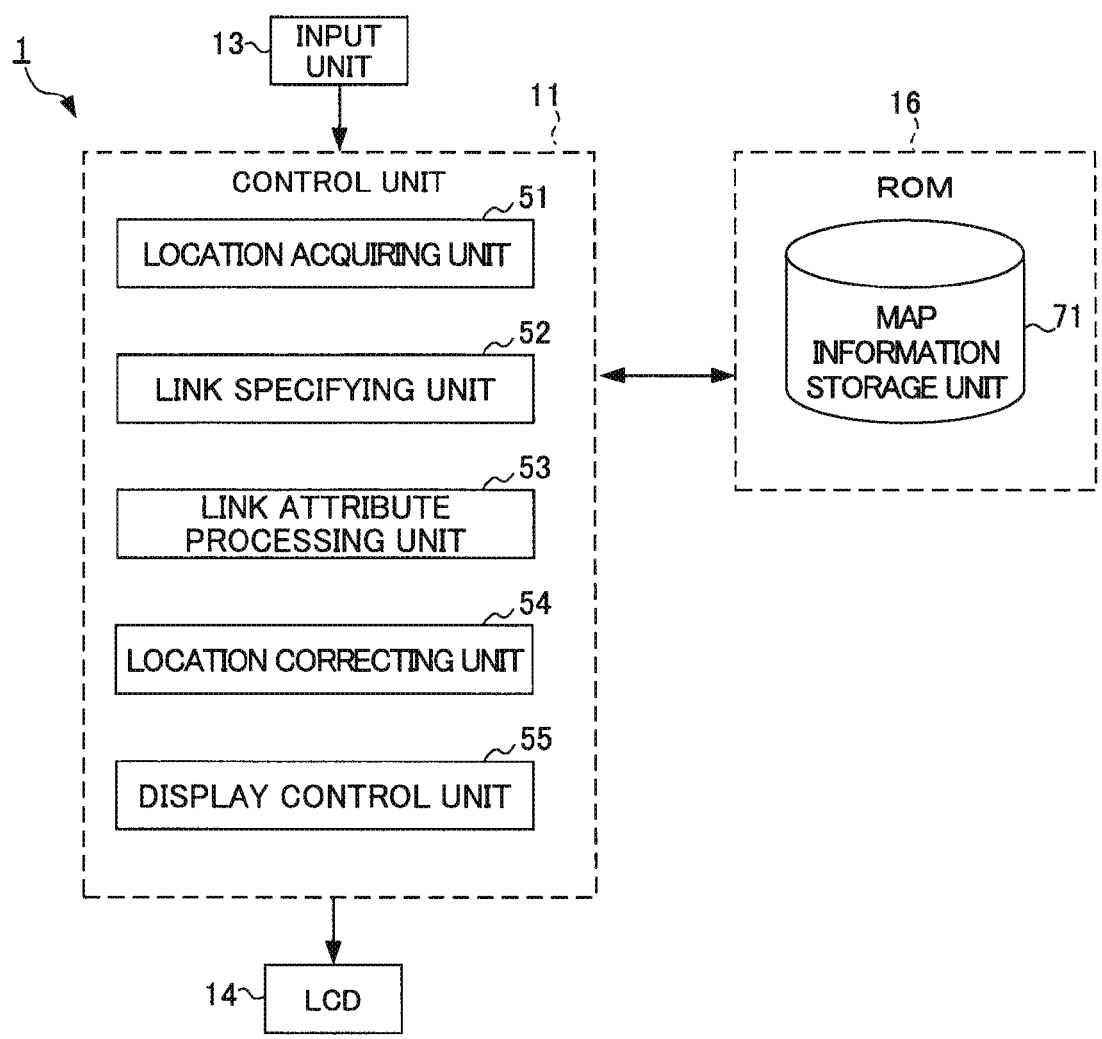
FIG. 3 is a functional block diagram illustrating a functional configuration for executing location estimating processing, among the functional configurations of the wrist terminal of FIG. 1.

FIG. 3 is a functional block diagram illustrating a functional configuration for executing location estimating processing among the functional configurations of the wrist terminal 1 of FIG. 1.

The location estimating processing refers to a sequence of processing of judging whether to correct a current location of the wrist terminal 1 acquired to a location on the link based on information of an area around the link and, in a case of being judged to correct, correcting the current location to a location on the link.

In a case of performing the location estimating processing, as illustrated in FIG. 3, a location acquiring unit 51, a link specifying unit 52, a link attribute processing unit 53, a location correcting unit 54, and a display control unit 55 function in the control unit 11. Furthermore, a map information storage unit 71 is provided in an area of the ROM 16.

The map information storage unit 71 stores a database storing map information.

Figures 4, 5:
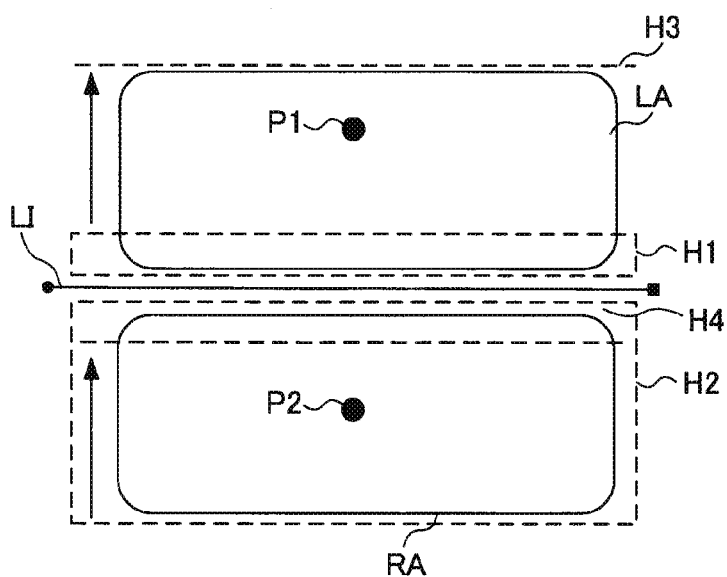
FIG. 4 is a conceptual view illustrating a data structure of a map information storage unit.
FIG. 5 is a schematic view illustrating a range of a correction area indicated by a link attribute of a link LI.

FIG. 4 is a conceptual view illustrating a data structure of the map information storage unit 71.

As illustrated in FIG. 4, the map information storage unit 71 stores link information corresponding to roads constituting the map.

In the link information, information relating to the latitude and longitude of a starting point and an ending point of a link (node), information relating to a link distance, information relating to a direction in which the link extends, and a link attribute are stored.

The link attribute includes information of adjacent areas of the link (the left area and the right area when viewing from the starting point to the ending point of the link). The link attribute includes, for each area, a correction area to correct the current location to a location on a link and a magnification/reduction condition to change (magnifies or reduces) a correction area in a case of meeting a predetermined condition.

With reference to FIG. 3 again, the location acquiring unit 51 acquires the current location of the wrist terminal 1.

More specifically, the location acquiring unit 51 acquires the current location of the wrist terminal 1 based on positional information acquired from the GPS module 19 and a travel distance acquired from the sensor unit 12.

The link specifying unit 52 specifies link information of the current location based on the current location acquired by the location acquiring unit 51.

More specifically, the link specifying unit 52 acquires link information proximal to the current location acquired by the location acquiring unit 51 from the map information storage unit 71. The link specifying unit 52 specifies the link information of the link proximal to the current location among the link information acquired, as link information of the current location.

The link attribute processing unit 53 specifies a correction area to a link based on a link attribute included in the link information of the current location specified by the link specifying unit 52.

More specifically, the link attribute processing unit 53 acquires the link attribute included in the link information of the current location specified by the link specifying unit 52. The link attribute processing unit 53 judges whether a use condition of the wrist terminal 1 meets a magnification/reduction condition included in the link attribute. When the use condition meets the magnification/reduction condition, the link attribute processing unit 53 changes the range of the correction area.

Here, the use condition refers to various conditions under which the wrist terminal 1 is used, and includes time, transportation means, and travel route, for example. When the magnification/reduction condition meets a use condition, the range of the correction area is changed.

For example, in a case in which an adjacent area is shown as a park for the link attribute, if the transportation means is walking, the possibility of traveling in the park is high. Therefore, it is not necessary to correct to a link and the range of the correction area is eliminated or reduced. On the other hand, if transportation means is a car, since the possibility of traveling in a park is low, the range of the correction area is made broader so that the current location can be easily corrected onto a link.

Furthermore, if an adjacent area is clearly an area in which there is not traveling such as a cliff, the entire area may be a correction area. Moreover, the link attribute processing unit 53 estimates a user's action and changes the range of the correction area according to a result of the estimation of an action. For example, in a case in which an adjacent area is shown as a building for the link attribute, if a result of the estimation of an action indicating having been stopped for a predetermined time around the entrance is acquired, the possibility of entering into the building will be high, and thus the range of the correction area is reduced.

Herein, the change of the range of the correction area at the link attribute processing unit 53 is described.

FIG. 5 is a schematic view illustrating the range of a correction area indicated by a link attribute of the link LI.

In FIG. 5, a correction area H1 of a left area LA and a correction area H2 of a right area RA which are included in the link attribute of the link LI are illustrated, respectively. Furthermore, a current location P1 and a current location P2 at a predetermined time are illustrated, respectively.

The correction area H1 is based on information of "left, 1 m" included in the link attribute of the map information storage unit 71 shown in FIG. 4. Furthermore, the correction area H2 is based on information of "right, 20 mm" included in the link attribute of the map information storage unit 71 shown in FIG. 4.

Since the current location P1 is not included in the range of the correction area H1, it is not corrected by the location correcting unit 54 (described later) and thus is displayed as-is by the display control unit 55 (described later). On the other hand, since the current location P2 is included in the range of the correction area H2, it is corrected onto a location on a link by the position correcting unit 54 (described later), and the location on the link is displayed by the display control unit 55 (described later).

The correction area H1 is associated with a magnification/reduction condition of "Time 5:00 to 22:00→20 m". In a case in which the current time in a use condition is "6:00", for example, the link attribute processing unit 53 changes the range (width) of the correction area H1 from "1 m" to "20 m".

The correction area H2 is associated with a magnification/reduction condition of "prior action, stopping, and entering→1 m". In a case in which the wrist terminal 1 enters the correction area H2 after a stop for a predetermined period of time (for example, three seconds), the link attribute processing unit 53 changes the range (width) of the correction area H2 from "20 m" to "1 m". In this way, the link attribute processing unit 53 changes the range of the correction area according to the result of the estimation of a user's action.

By the link attribute processing unit 53 changing the range of the correction area H1, since the current location P1 is included in the range of the correction area H1, the current location P1 is corrected to a location on the link by the location correcting unit 54 (described later), and the location on the link is displayed by the display control unit 55 (described later). On the other hand, by the link attribute processing unit 53 changing the range of the correction area H2, since the current location P2 is not included in the range of the correction area H2, the current location P2 is not corrected by the position correcting unit 54 (described later) and is displayed by the display control unit 55 (described later) as-is, as the current location P2.

With reference to FIG. 3 again, the location correcting unit 54 corrects the current location to the location on the link based on the correction area.

More specifically, the location correcting unit 54 judges whether the current location is included in the correction area included in the link attribute processed by the link attribute processing unit 53. If the current location is included in the correction area, the location correcting unit 54 corrects the current location from the current location on the link to the closest location on the link.

Furthermore, if the current location is not included in the correction area, the location correcting unit 54 corrects the current location with reference to a correction amount by which having corrected to a location on a link while the wrist terminal 1 belonged to the correction area previously. With such a configuration, it is possible to reduce errors that are estimated to be included in current location acquired and to estimate a more appropriate current location.

Furthermore, at this time, the location correction unit 54 limits a correction amount so that the current location after correction does not deviate from a current adjacent area. In other words, if the current location is out of the range of the correction area, correction of the current location is performed within an adjacent area to which the current location belongs.

By performing this, it is possible to suppress the current location after correction from becoming an inappropriate location. The display control unit 55 superimposes the current location processed by the location correcting unit 54 on the map and displays on the LCD 14.

Operation

Next, operations will be described.

Figure 6:
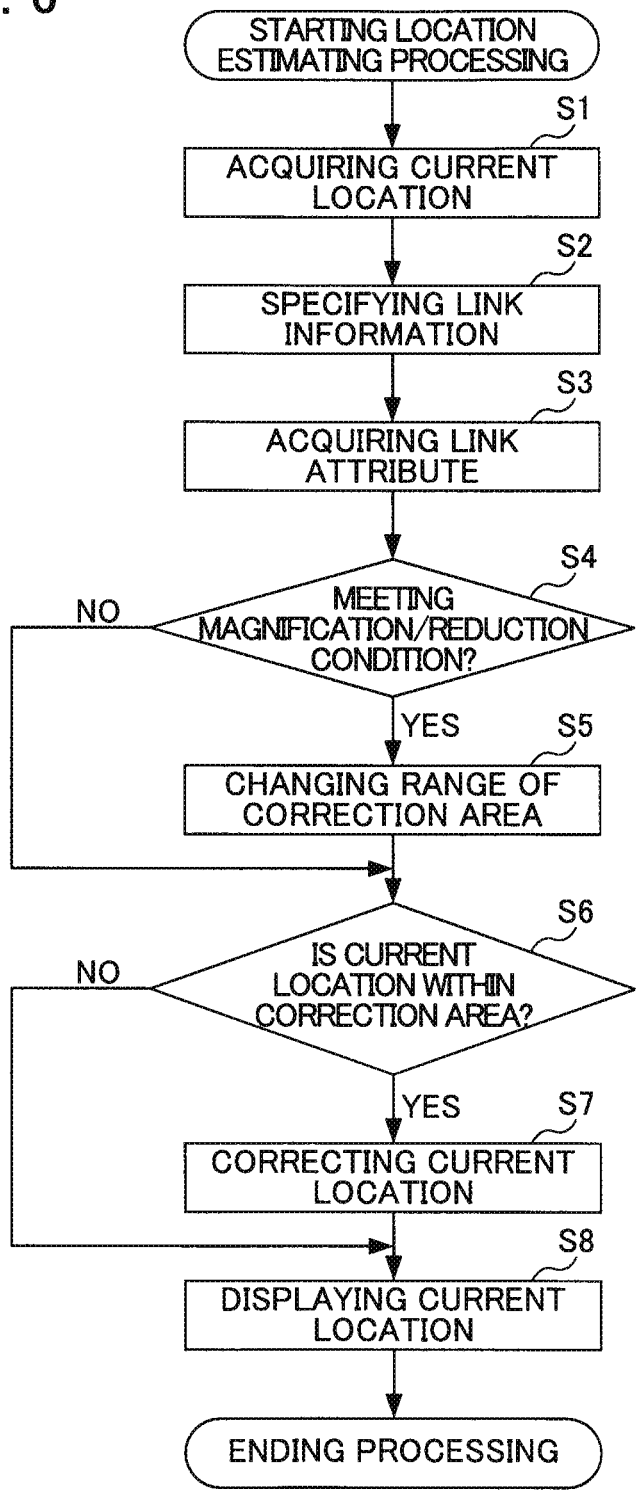
FIG. 6 is a flowchart illustrating the flow of location estimating processing executed by the wrist terminal of FIG. 1 having the functional configuration of FIG. 3.

FIG. 6 is a flowchart illustrating the flow of location estimating processing executed by the wrist terminal of FIG. 1 having the functional configurations of FIG. 3.

The location estimating processing starts when the input unit 13 of the wrist terminal 1 receiving a user's operation for starting the location estimating processing and the location estimating processing is performed repeatedly until a user's operation for ending is received.

When the location estimating processing starts, in Step S1, the location acquiring unit 51 acquires the current location of the wrist terminal 1.

In Step S2, the link specifying unit 52 refers to the map information storage unit 71 and specifies link information of a link which is located closest to the current location as link information of the current location.

In Step S3, the link attribute processing unit 53 acquires a link attribute included in the link information of the current location specified by the link specifying unit 52.

In Step S4, the link attribute processing unit 53 judges whether a use condition of the wrist terminal 1 meets a magnification/reduction condition included in the link attribute.

In a case in which the use condition of the wrist terminal 1 meets the magnification/reduction condition included in the link attribute, it is judged as YES in Step S4, and the processing advances to Step S5.

On the other hand, in a case in which the use condition of the wrist terminal 1 does not meet the magnification/reduction condition included in the link attribute, it is judged as NO in Step S4, and the processing advances to Step S6.

In Step S5, the link attribute processing unit 53 changes the range of the correction area included in the link attribute.

In Step S6, the location correcting unit 54 judges whether the current location is included in the correction area.

In a case in which the current location is included in the correction area, it is judged as YES in Step S6, and the processing advances to Step S7.

On the other hand, in a case in which the current location is not included in the correction area, it is judged as NO in Step S6, and the processing advances to Step S8.

In Step S7, the location correcting unit 54 corrects the current location from the current location on the link to the closest location.

In Step S8, the display control unit 55 superimposes the current location on the map and displays on the LCD 14.

After the processing of Step S8, the location estimating processing is repeated.

With such processing, the range of the correction area to correct the current location to a location on a link is set based on an attribute of an area adjacent to a link proximal (close) to the current location. Furthermore, the range of the correction area is changed based on a use condition of the wrist terminal 1 and a magnification/reduction condition of a link attribute. Then, whether the current location is corrected to a location on a link is changed depending on whether the current location acquired belongs to the range of the correction area.

Therefore, it is possible to estimate a location with higher precision.

The wrist terminal 1 configured as described above includes the location acquiring unit 51, the link attribute processing unit 53, and the location correcting unit 54.

The location acquiring unit 51 acquires the current location on a map.

The link attribute processing unit 53 sets a correction area within the adjacent area, the correction area being referred to correct the current location to a location on the link.

In a case in which the current location acquired by the location acquiring unit 51 belongs within the correction area set within the adjacent area, the location correcting unit 54 corrects the current location onto a location on the link which corresponds to the correction area.

With such a configuration, a correction to the link of the current location is performed according to the range of the correction area set based on the attribute of the adjacent area of the link.

Therefore, it is possible to estimate the location with higher precision.

Furthermore, the link attribute processing unit 53 changes the range of the correction area based on the link attribute.

With such a configuration, since it is possible to set the range of the correction area more appropriately, it is possible to estimate the location with higher precision.

Furthermore, the link attribute includes a modification condition to modify the range of the correction area.

The link attribute processing unit 53 modify the correction area based on the modification condition and a use condition of the electronic apparatus.

With such a configuration, since it is possible to correct the current location according to a change of an attribute of an adjacent area which is produced by a change of the use condition, it is possible to estimate the location with higher precision.

Furthermore, the link attribute includes a modification condition to modify the range of the correction area.

The link attribute processing unit 53 modify the range of the correction area based on the modification condition and a result of an estimation of a user's action.

With such a configuration, since it is possible to judge whether belonging specifically to an adjacent area according to the difference of the user's action, it is possible to estimate the location with higher precision.

Furthermore, in a case in which the current location acquired by the location acquiring unit 51 belongs to an area outside of the correction area set within the adjacent area by the correction area setting unit, the location correcting unit 54 corrects the current location based on a correction amount in the past, the correction amount in the past being an amount by which the location correcting unit have corrected the current location in the past while the current location belonged to the correction area set within the adjacent area by the correction area setting unit.

With such a configuration, even in a case in which the current location does not belong to the correction area, it is possible to reduce errors included in the current location acquired and to estimate the location with higher precision.

Furthermore, in a case of correcting the current location based on the correction amount in the past, the location correcting unit 54 corrects the current location within the adjacent area to which the current location belongs.

With such a configuration, it is possible to suppress the current location from being corrected to be an inappropriate location upon correcting the current location in a case in which the current location does not belong to the correction area, and to estimate the location with higher precision.

It should be noted that the present invention is not to be limited to the aforementioned embodiment, and that modifications, improvements, etc. within a scope that can achieve the objects of the present invention are also included in the present invention.

Although the use condition of the wrist terminal 1 is exemplified as an example of the magnification/reduction condition in the abovementioned embodiments, the use condition includes the transportation means of the user of the wrist terminal 1 (such as walking or travel by bicycle). Furthermore, it may be configured so as to judge the appropriateness of a trajectory of travel according to the transportation means of a user (an appropriateness of a direction change with respect to speed) and judge whether the user has entered an adjacent area.

In addition, in the abovementioned embodiment, it may be configured so as to include the structures of buildings such as a location of an entrance for the adjacent area as an attribute of the adjacent area.

Moreover, in a case in which a current location is included in a correction area, the location correcting unit 54 corrects the current location to a location on a link in the present embodiment. However, the present invention is not limited thereto. For example, in a case in which the current location is included in a correction area, the location correcting unit 54 may correct the current location to the closest location from among locations on the link and adjacent areas that can be entered.

Furthermore, although the map information storage unit 71 is described as being stored in the wrist terminal 1 in the abovementioned embodiment, the present invention is not particularly limited thereto. For example, it may be configured so that an electronic device other than the wrist terminal 1 includes the map information storage unit 71, and the wrist terminal 1 acquires information from the map information storage unit 71 via the wireless communication module 21.

Furthermore, although the wrist terminal 1 executes the functional configuration of the location correcting unit 54 and the like in the abovementioned embodiment, the present invention is not particularly limited thereto. For example, it may be configured so that the wrist terminal 1 acquires a processing result by causing an external server to execute a part of processing executed by the functional configurations.

In the aforementioned embodiments, the wrist terminal has been described as an example of an electronic apparatus to which the present invention is applied, but the present invention is not limited thereto in particular.

For example, the present invention can be applied to any electronic device in general having a function of estimating a location. More specifically, for example, the present invention can be applied to a lap-top personal computer, a tablet type terminal, a video camera, a portable navigation device, a cell phone device, a smart phone, a portable gaming device, and the like.

The processing sequence described above can be executed by hardware, and can also be executed by software.

In other words, the hardware configuration shown in FIG. 3 is merely an illustrative example, and the present invention is not particularly limited thereto. More specifically, the types of functional blocks employed to realize the above-described functions are not particularly limited to the example shown in FIG. 3, so long as the wrist terminal 1 can be provided with the functions enabling the aforementioned processing sequence to be executed in its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trade Mark) or the like. The magnetic optical disk is composed of an MD (Mini-Disk) or the like. The storage medium supplied to the user in a state incorporated in the device main body in advance may include, for example, the ROM 16 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

Although some embodiments of the present invention have been described above, the embodiments are merely exemplification, and do not limit the technical scope of the present invention. Other various embodiments can be employed for the present invention, and various modifications such as omission and replacement are possible without departing from the spirits of the present invention. Such embodiments and modifications are included in the scope of the invention and the summary described in the present specification, and are included in the invention recited in the claims as well as the equivalent scope thereof.

What is claimed is:

1. An electronic apparatus for acquiring a location, comprising:
   a location acquiring unit which acquires a current location of the electronic apparatus;
   a correction area setting unit which, based on a link attribute indicating an attribute of an adjacent area of a link in map data, sets a correction area within the adjacent area, the correction area being referred to correct the current location to a location on the link; and
   a location correcting unit which, in a case in which the current location acquired by the location acquiring unit belongs to the correction area set within the adjacent area, corrects the current location to a location on the link which corresponds to the correction area, wherein
   the link attribute includes a modification condition to modify the range of the correction area, and
   the correction area setting unit modifies the range of the correction area based on the modification condition and a result of an estimation of a user's action.

2. The electronic apparatus according to claim 1, wherein the range of the correction area set by the correction area setting unit differs depending on the link attribute.

3. The electronic apparatus according to claim 1, wherein the correction area setting unit modifies the correction area based on the modification condition and a use condition of the electronic apparatus.

4. The electronic apparatus according to claim 1, wherein in a case in which the current location acquired by the location acquiring unit belongs to an area outside of the correction area set within the adjacent area by the correction area setting unit, the location correcting unit corrects the current location based on a correction amount in the past, the correction amount in the past being an amount by which the location correcting unit have corrected the current location in the past while the current location belonged to the correction area set within the adjacent area by the correction area setting unit.

5. The electronic apparatus according to claim 4, wherein, in a case of correcting the current location based on the correction amount in the past, the location correcting unit corrects the current location within the adjacent area to which the current location belongs.

6. A location estimating method executed by an electronic apparatus, the method comprising:
   acquiring a current location of the electronic apparatus;
   setting a correction area within the adjacent area based on a link attribute indicating an attribute of an adjacent area of a link in map data, the correction area being referred to correct the current location to a location on the link; and
   correcting the current location to a location on the link which corresponds to the correction area, in a case in which the current location acquired in the location acquiring step belongs to the correction area, wherein
   the link attribute includes a modification condition to modify the range of the correction area, and
   the correction area setting unit modifies the range of the correction area based on the modification condition and a result of an estimation of a user's action.

7. A non-transitory storage medium encoded with a computer-readable program for controlling an electronic apparatus, the program enabling a computer to execute:
   to acquire a current location of the electronic apparatus;
   to set a correction area within the adjacent area based on a link attribute indicating an attribute of an adjacent area of a link in map data, the correction area being referred to correct the current location to a location on the link; and
   to correct the current location to a location on the link which corresponds to the correction area, in a case in which the current location acquired in the location acquiring step belongs to the correction area, wherein
   the link attribute includes a modification condition to modify the range of the correction area, and
   the correction area setting unit modifies the range of the correction area based on the modification condition and a result of an estimation of a user's action.

* * * * *